US010958762B2

(12) United States Patent
Le Huerou et al.

(10) Patent No.: US 10,958,762 B2
(45) Date of Patent: Mar. 23, 2021

(54) METHOD FOR COMMUNICATING A STATUS OF PRESENCE OF A GROUP OF USERS IN A VIRTUAL COMMUNICATION SPACE PROVIDED BY A COMMUNICATION SERVER ON A COMMUNICATION NETWORK

(71) Applicant: Orange, Paris (FR)

(72) Inventors: Emmanuel Le Huerou, Saint Quay Perros (FR); Francois Toutain, Louannec (FR); Richard Salin, Meylan (FR)

(73) Assignee: ORANGE, Paris (FR)

( * ) Notice: Subject to any disclaimer, the term of this patent is extended or adjusted under 35 U.S.C. 154(b) by 256 days.

(21) Appl. No.: 14/649,871

(22) PCT Filed: Dec. 3, 2013

(86) PCT No.: PCT/FR2013/052916
§ 371 (c)(1),
(2) Date: Jun. 4, 2015

(87) PCT Pub. No.: WO2014/087087
PCT Pub. Date: Jun. 12, 2014

(65) Prior Publication Data
US 2016/0014231 A1 Jan. 14, 2016

(30) Foreign Application Priority Data
Dec. 4, 2012 (FR) ..................................... 1261629

(51) Int. Cl.
*H04L 29/08* (2006.01)
*H04L 12/58* (2006.01)
(Continued)

(52) U.S. Cl.
CPC .......... *H04L 67/36* (2013.01); *G06F 3/04817* (2013.01); *H04L 12/18* (2013.01);
(Continued)

(58) Field of Classification Search
CPC ......... G06F 3/048; G06F 15/16; H04L 67/24; H04L 12/1831; H04L 51/043;
(Continued)

(56) References Cited

U.S. PATENT DOCUMENTS 5,490,245 A * 2/1996 Wugofski ........... G06F 3/04817
715/837
7,620,902 B2 * 11/2009 Manion .................. G06Q 10/10
709/204
(Continued)

FOREIGN PATENT DOCUMENTS

| EP | 0898424 A2 | 2/1999 |
| EP | 0989700 A2 | 3/2000 |

(Continued)

OTHER PUBLICATIONS

English translation of the International Written Opinion dated Feb. 4, 2014 for corresponding International Application No. PCT/FR2013/052916, filed Dec. 3, 2013.
(Continued)

*Primary Examiner* — Tan H Tran
(74) *Attorney, Agent, or Firm* — David D. Brush; Westman, Champlin & Koehler, P.A.

(57) ABSTRACT

A method of communicating a presence state for a group of users having user terminals relating to their presence in a virtual communication space provided by a communication server on a communication network. The virtual space provides a plurality of distinct communication modes referred to as "activities" that can be shared by all of the users of said group. The method includes associating each
(Continued)

activity of the virtual space with a graphics icon representing the activity, the icon being for displaying via a graphics interface implemented by any activity sharing client application that is installed in each user terminal. A presence state is determined for each user of the group. For each of the activities, a graphical representation for the associated icon is determined as a function of the presence state for the users relative to the activity, enabling visual identification of user(s) participating in the activity.

10 Claims, 3 Drawing Sheets (51) Int. Cl.
| | | |
|---|---|---|
| *H04L 12/18* | (2006.01) | |
| *G06F 3/0481* | (2013.01) | |
| *H04N 21/431* | (2011.01) | |
| *H04N 21/4788* | (2011.01) | |
| *H04M 3/42* | (2006.01) | |
| *H04N 21/47* | (2011.01) | |
| *H04N 21/6547* | (2011.01) | |

(52) U.S. Cl.
CPC ........ *H04L 12/185* (2013.01); *H04L 12/1813* (2013.01); *H04L 12/1831* (2013.01); *H04L 51/043* (2013.01); *H04L 51/32* (2013.01); *H04L 67/14* (2013.01); *H04L 67/24* (2013.01); *H04L 67/306* (2013.01); *H04M 3/42093* (2013.01); *H04M 3/42365* (2013.01); *H04N 21/4312* (2013.01); *H04N 21/4788* (2013.01); *H04N 21/47* (2013.01); *H04N 21/6547* (2013.01)

(58) Field of Classification Search
CPC ......... H04L 67/14; H04L 51/32; H04L 67/36; H04L 12/18; H04L 12/1813; H04L 12/185; H04L 67/306; H04N 21/4788
See application file for complete search history.

(56) References Cited

U.S. PATENT DOCUMENTS

| | | | | |
|---|---|---|---|---|
| 8,219,924 | B2 * | 7/2012 | Christensen | G06F 3/04817 715/772 |
| 8,671,146 | B2 * | 3/2014 | Dilillo | G06F 11/0709 370/230 |
| 9,166,806 | B2 * | 10/2015 | Dean | G06F 17/30699 |
| 9,215,286 | B1 * | 12/2015 | Schilit | H04L 67/22 |
| 9,310,955 | B2 * | 4/2016 | Haswell | G06F 3/048 |
| 9,417,759 | B1 * | 8/2016 | Srinivasan | G06F 17/30899 |
| 9,448,682 | B2 * | 9/2016 | Yerli | G06F 3/048 |
| 9,462,017 | B1 * | 10/2016 | Siracusano, Jr. | H04L 65/4038 |
| 2002/0075304 | A1 | 6/2002 | Thompson et al. | |
| 2003/0210265 | A1 | 11/2003 | Haimberg | |
| 2007/0121867 | A1 * | 5/2007 | Ozugur | H04L 67/24 379/201.1 |
| 2008/0201438 | A1 * | 8/2008 | Mandre | H04L 51/04 709/206 |
| 2010/0175100 | A1 * | 7/2010 | Ogasawara | H04L 67/24 725/114 |
| 2011/0298618 | A1 * | 12/2011 | Stahl | H04M 1/72519 340/573.1 |
| 2012/0150970 | A1 | 6/2012 | Peterson et al. | |
| 2013/0185368 | A1 * | 7/2013 | Nordstrom | H04W 4/023 709/206 |
| 2014/0012905 | A1 * | 1/2014 | Roche | H04L 51/36 709/204 |
| 2014/0137000 | A1 * | 5/2014 | Klassen | H04L 51/04 715/753 |
| 2016/0014188 | A1 | 1/2016 | Le Huerou et al. | |

FOREIGN PATENT DOCUMENTS

| | | |
|---|---|---|
| EP | 2237533 A1 | 10/2010 |
| FR | 1261555 | 12/2012 |

OTHER PUBLICATIONS

International Search Report and Written Opinion dated Feb. 4, 2014 for corresponding International Application No. PCT/FR2013/052916, filed Dec. 3, 2013.

* cited by examiner

METHOD FOR COMMUNICATING A STATUS OF PRESENCE OF A GROUP OF USERS IN A VIRTUAL COMMUNICATION SPACE PROVIDED BY A COMMUNICATION SERVER ON A COMMUNICATION NETWORK

CROSS-REFERENCE TO RELATED APPLICATIONS

This application is a Section 371 National Stage Application of International Application No. PCT/FR2013/052916, filed Dec. 3, 2013, the content of which is incorporated herein by reference in its entirety, and published as WO 2014/087087 A1 on Jun. 12, 2014, not in English.

FIELD OF THE DISCLOSURE

The invention relates in general manner to the field of telecommunications and more precisely to communicating a presence state for a group of users in a virtual communication space provided by a communication server on a communication network, the virtual space providing a plurality of distinct communication modes that can be shared by all of the users of the above-mentioned group.

BACKGROUND OF THE DISCLOSURE

With the development over recent years of communication terminals such as smart phones, and of communications networks, in particular with the appearance of so-called social networks based on the Internet, the users of fixed or mobile terminals can make use of applications installed on their terminals and/or accessible over the Internet for the purpose of sharing activities such as sharing photos or videos, playing games, or exchanging messages. By way of example, mention may be made of the Facebook™ social network service that serves in particular to enable friends to share photos and/or videos, the WhatsApp™ mobile application incorporating an instant messaging system, and the Draw Something™ drawing game mobile application.

Applications of the types mentioned above generally implement user interfaces enabling a user who is connected to the service in question to know whether another user is connected to the service, e.g. by displaying an icon of color that represents the connected state (e.g. green).

Nevertheless, the above-mentioned user interfaces generally do not make it possible to indicate that a user is connected to only one of the activities made available by the service, and they are therefore not suitable for giving a user effective information about the simultaneous presence of several users with one activity taken from a set of activities that can be shared by a group or community of users.

SUMMARY

A first aspect of the present invention provides a method of communicating a presence state for a group of users having user terminals relating to their presence in a virtual communication space provided by a communication server on a communication network, the virtual space providing a plurality of distinct communication modes referred to as "activities" that can be shared by all of the users of said group. According to the invention, the above-mentioned method comprises the operations consisting in:

associating each activity of the virtual space with a graphics icon having a geometrical shape and representing the activity, the icon being for displaying via a graphics interface implemented by an activities sharing client application that is installed in each user terminal;

determining a presence state for each user of the group in the virtual communication space; and determining for each of the activities a graphical representation for the associated icon without modifying the geometrical shape of the icon, the graphical representation being determined as a function of the presence state for the users relative to the activity, and making it possible visually to identify the user(s) participating in the activity.

By means of the communication method of the invention as defined in general terms above, and in particular because of the characteristic whereby the graphical representation of an icon associated with an activity is determined as a function of the presence state for users relating to that activity, any user in the group of users can, merely by looking at such a graphics icon, identify simultaneously the activity in question and the users who are participating in that activity.

In a particular implementation of the invention, the above method further includes an operation consisting in previously associating each user of the group with a specific color representing the user, and, under such circumstances, the graphical representation of an icon associated with a given activity is determined as a function of the color(s) respectively representing the user(s) present for that activity.

Under such circumstances, in one particular implementation, when no user is present for a given activity, the graphics icon associated with that activity is displayed with a determined color that is said to be "neutral" (e.g. dimmed). When only one user is present, the graphics icon associated with the activity is graphically represented with the color identifying the user present for that activity. Finally, when at least two users are present, the graphics icon associated with the activity is graphically represented with the various colors respectively identifying the users who are present.

Representing an activity icon with a plurality of colors identifying respective users participating in that activity serves to inform a user of the service looking at the icon immediately and effectively about the presence of users for that activity.

In implementations, such an icon may have a shape that symbolizes the activity, e.g. a musical note for a music sharing activity, a paintbrush for a drawing activity, a speech bubble for a messaging activity, etc. For example, for two users participating in an activity, the top portion of the corresponding icon may be represented with a first color corresponding to one user while its bottom portion is represented with a second color corresponding to the other user.

When some number of users greater than three or four are sharing a given activity, it is possible to select as an icon a geometrical shape associated with text information or a symbol positioned inside the geometrical shape. For example, a rectangle surrounding a musical note could be subdivided into eight sectors of equal area in the event of eight users sharing the same music sharing activity. Each sector could then be graphically displayed with a different color, each color identifying one of the eight users.

In a particular implementation of the invention, the operation of determining a presence state for each user of the group in the virtual communication space comprises:

detecting a connection of a user to the communication server and the selection of an activity by that user; and
updating a data structure putting activity identifiers into correspondence with user identifiers, a user identifier put into correspondence with an activity identifier indicating that the corresponding user is currently present in the corresponding activity.

By way of example, such a data structure may be constituted by a database table.

In an implementation, in response to the above-mentioned data structure being updated, a presence notification message is transmitted to the user terminals in order to cause the graphics interface being used by the client application in each terminal to be updated correspondingly.

Thus, in this implementation, management of the presence of the users of the group with respect to the activities made available by the virtual space is performed at the server end, whereas management of the display of icons as a function of the user presence state is performed remotely at the terminal end.

In practice, the present invention is incorporated in a communication service that is accessible by connecting to a communication server that provides a virtual sharing space, in which each activity of the virtual space relates to at least one associated multimedia content, referred to as "activity content", that is shared by the users of the group, each activity being performed by determined actions that can be triggered for execution by all of the users of the group. In the communication service, the actions include at least actions of creating, modifying, or deleting a given activity content, and requests for actions relating to an activity in question and coming from the terminals of the users of the group are processed sequentially in the order of arrival of the requests.

In a particular implementation of the invention, an action being executed by a user present in a given activity leads to an additional graphics effect on the icon representing the activity in question, this graphics effect indicating that this user present in that activity is currently active.

For example, the above-mentioned graphics effect may be flashing or shimmering of a zone of the icon having the color that corresponds to the user who is present and active, i.e. who is causing an action to be executed relating to the activity symbolized by the icon; the absence of such an additional graphics effect consequently indicates that the user is connected to the activity (i.e. is present), but is currently inactive.

In another example, the additional graphics effect may consist in adding an additional graphics element in the zone of the icon having the color indicative of the presence of the user, which additional element indicates the activity state (active or inactive) of the user and may be constituted by one or more characters.

The invention is particularly suitable for use in such a communication service that advantageously enables a group of users to have available a multimodal virtual communication space, i.e. a space providing a variety of communication modes, such as telephone communication, video phone communication, exchanging messages of the short message service (SMS), multimedia message service (MMS), or email type, or instant messaging (also known as "chat"), and also communication modes involving synchronous or asynchronous sharing of multimedia contents: photos, videos, drawings, etc. Furthermore, in this implementation of the invention, the users in the group in question all have the same access and modification rights over the shared contents, thereby simplifying the settings of the server application, achieving a kind of co-ownership of the virtual space and the associated contents between the various users of the group. The processing of action requests sent by the users to the server, as a function of the order of arrival of the requests, makes it possible to compensate for the lack of management of access rights that are defined as a function of users, and to establish a virtual communication space in which all of the members of the group have the same rights.

In a second aspect, the invention provides a communication server suitable for implementing a method of communicating a presence state for a group of users having user terminals and relating to their presence in a virtual communication space provided by a communication server on a communication network, the virtual space providing a plurality of distinct communication modes referred to as "activities" that can be shared by all of the users of the group, each activity made available by the virtual space being associated with a graphics icon representing the activity and for being displayed via a graphics interface implemented by an activity sharing client application installed in each user terminal. In accordance with the invention, such a communication server comprises:

means for determining a presence state for each user of the group in the virtual communication space; and means for acting following a change in the presence state for the group of users in the virtual space by sending presence notification messages to user terminals in order to cause each of the destination terminals to update in corresponding manner the graphics interface being used by the client application of each terminal.

In a particular implementation, the above-mentioned means for detecting a presence state include:

means for detecting the connection of a user to the virtual communication space and for detecting the selection of an activity by a user; and means for updating a data structure that puts activity identifiers into correspondence with user identifiers, a user identifier that is put into correspondence with an activity identifier indicating that the corresponding user is currently present in the corresponding activity.

A change of the presence state for the group of users in the virtual space thus gives rise to updating of the above-mentioned data structure.

Correspondingly, in a third aspect, the invention relates to a communication terminal comprising:

means for connecting to a virtual communication space provided by a communication server on a communication network, the virtual space providing a plurality of distinct communication modes referred to as "activities", suitable for being shared by all of the users of a determined group of users;

message processing means for processing presence notification messages received from the notification server and conveying information about a change in the presence state for the users in the virtual space; and graphics interface means coupled to the message processing means in order to display a graphics icon for each of the activities, each graphics icon having a geometrical shape and representing the activity in question, and in order to determine for each of the activities a graphical representation of the associated icon without changing the geometrical shape of the icon, the graphical representation being determined as a function of the presence state for the users relating to that activity, and making it possible visually to identify the user(s) participating in that activity.

In a particular embodiment of the invention, the graphics interface means of such a communication terminal determine the graphical representation of an icon associated with a given activity as a function of one or more colors respectively representing the user(s) present for that activity, a specific color being allocated beforehand to each user in order to represent that user.

In general manner, the above-described communication method of the invention is implemented by executing software applications installed and executed respectively in a communication server (server application) and in communication terminals (client applications) of the invention. These software applications implement one or more computer programs including instructions that, when executed by a processor of such a server or of such a terminal, as the case may be, serve to perform the steps of a communication method of the invention.

Consequently, in a fourth aspect, the present invention provides a computer program installed in a communication server of the invention or in a communication terminal of the invention, such a program including instructions that, when executed by a processor, cause a communication method of the invention to be performed.

Furthermore, the above-mentioned computer program may use any programming language, and may be in the form of source code, object code, or code intermediate between source code and object code, e.g. in a partially compiled form.

In practice, such a computer program is stored on a computer readable data medium, and consequently the present invention also provides a computer readable data medium having stored thereon instructions of a computer program of the invention. Such a data medium may be constituted by any entity or device capable of storing such a program. For example, the medium may comprise storage means, such as a read only memory (ROM), e.g. a compact disk (CD) ROM, or a microelectronic circuit ROM, or indeed removable storage means such as a universal serial bus (USB) key or magnetic recording means such as a hard disk. Furthermore, a program or software module of the invention may in particular be downloaded from an Internet type network.

The advantages provided by a communication server, a communication terminal, and a computer program as briefly summarized above are identical and contribute to those already mentioned for the communication method of the invention, so these advantages are not repeated at this point.

BRIEF DESCRIPTION OF THE DRAWINGS

Other characteristics and advantages of the present invention appear from the following detailed description, which refers to the accompanying drawings, in which.

DETAILED DESCRIPTION OF ILLUSTRATIVE EMBODIMENTS

There follows a detailed description of an implementation of the invention given by way of example. In this implementation, the method the invention for communicating a presence state is applied to a virtual communication space of the kind described in the following patent document: French patent application No. 12/61555 filed on Dec. 3, 2012 by the present Applicant. Reference may be made to that document, in particular in order to obtain more details concerning the creation of such a virtual communication space and how it is used.

Figure 1:
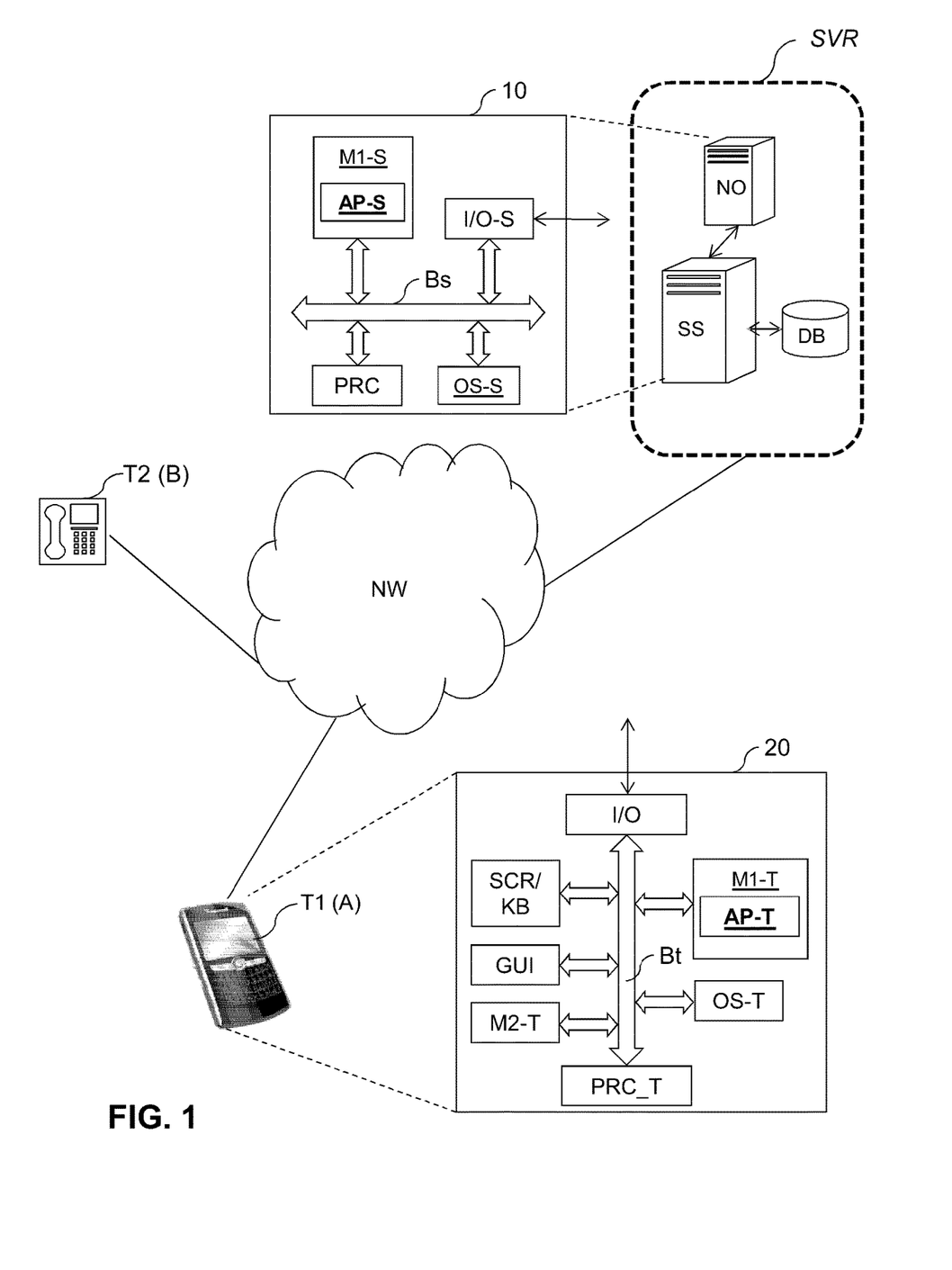
FIG. 1 shows an example of a telecommunication system in which the present invention is implemented, and in particular it shows the functional elements that are incorporated respectively in a communication terminal and in a communication server in accordance with the invention.

FIG. 1 shows an example of a telecommunications system in which the invention is implemented. In this example, only two communication terminals T1 and T2 are shown, which are used by users A and B respectively, e.g. terminals of the smart phone type suitable for connecting to a so-called "$3^{rd}$ generation" mobile network, e.g. complying with the universal mobile telecommunications system (UMTS) standard, or a so-called "$4^{th}$ generation" mobile network, e.g. in compliance with the long term evolution (LTE) standard. The terminals T1 and T2 are also suitable for connecting to a communication network NW, which is constituted in this example by an Internet protocol (IP) network, such as the Internet.

The system also has a communication server SVR connected to the network NW and providing a service of hosting and managing virtual communication spaces in accordance with the invention. The server SVR comprises, in simplified manner: a database DB for storing the data relating to the virtual spaces created by groups of users; and a notification server entity NO for transmitting notifications to members of a group to notify them about changes that have taken place in the communication space of the group in question. The server SVR includes a virtual space server entity SS that serves to implement the communication modes (activities) defined for each virtual communication space in association with the database DB and with the notification server entity NO.

For simplification purposes, FIG. 1 shows the server SVR as being made up of entities (NO, SS, DB) that are located close to one another. Nevertheless, it is equally possible to select an embodiment in which the server SVR is made up of entities that are remote from one another or that are distributed over the network. In particular, the multimedia content or data associated with the activities and shared within the virtual space may come from a server that is distinct and remote and that provides a multimedia content storage service (e.g. for photos).

Consideration is given at this point to a virtual communication space associated with a determined group of users. By way of example, the group of users in question may be a group of friends or a group made up of members of a family, or indeed of the employees of a small business. The virtual communication space associated with this group is a communication space that is said to be "persistent", in that this communication space continues to exist even when no member of the group is connected to the space.

While the space in question is being configured, various modes of communication, referred to as "activities", are selected by a user of the group, for example the following activities: sharing/consulting photos, sharing/consulting videos, sharing/consulting maps (road maps, itineraries, geographical maps, . . . ), text communication (email, SMS and MMS messages, instant messaging), telephone communication, video phone communication.

In accordance with the invention, the virtual space server SS has a module for managing the presence of users of the group with the activities made available by the virtual space in association with a correspondence table matching activity identifiers with user identifiers.

The presence management module of the virtual space server SS determines a presence state for each user of the group in the virtual communication space. For this purpose, the presence management module has a software entity suitable for detecting the connection of a user to the virtual communication space and for detecting the selection of an activity by a user connected to the server SVR. The presence management module also has an entity for updating the above-mentioned correspondence table, for putting activity identifiers into correspondence with user identifiers. In that table, a user identifier that is in correspondence with an activity identifier indicates that the corresponding user is currently present in the corresponding activity.

The above-mentioned notification server entity NO, forming part of the server SVR, also serves, in accordance with the invention, to create and transmit presence notification messages to the user terminals (T1, T2) as a result of updating of the above-mentioned correspondence table, so as to cause each of the destination terminals to update in corresponding manner the graphics interface used by the client application of each terminal.

In practice, the communication server SVR is made up of elements having the hardware architecture of a computer 10. This architecture comprises in particular a processor (PRC) and memory components of the ROM and random access memory (RAM) type communicating via one or more data buses (Bs). From a functional point of view, the server SVR comprises the following modules:

- a network communication interface module I/O-S for communicating with the network NW in particular for the purpose of receiving requests from user terminals T1, T2 associated with a virtual space stored in the database DB (e.g. creation and/or action requests), or to transmit notifications or updates about a given virtual space to the terminals (T1, T2) of users of the group associated with that space;
- an operating system module OS-S managing interactions between the various modules and the processor PRC of the server; and
- a memory module M1-S storing instructions of the server application program AP-S of the invention, which, on being executed by the processor PRC, causes steps of the method of the invention for communicating a presence state to be performed, which steps are implemented in the server SVR. Moreover, the server application program AP-S also serves to implement operations for creating a virtual communication space that is persistent for a group of users, which virtual space provides distinct modes of communication (referred to as "activities"), and for processing action requests relating to an activity under consideration and coming from the terminals of the users of the group, with the requests being processed sequentially in the order of their arrival.

The memory module M1-S serves in particular to store the software components giving access, via a web portal, to a space server entity SS and in particular to the application program interfaces (APIs) needed for remote interaction with the space server entity SS and the space database DB. The memory module M1-S also stores the software or algorithms for executing the communication modes (known as "activities") available in each virtual space that has been created. Finally, the memory module M1-S has a user authentication submodule that serves to verify the identity data of a user of a group of users during an attempt to connect with a virtual space.

Still with reference to FIG. 1, the internal structure of a user terminal of the invention is shown under reference number 20. The user terminals T1, T2 are constituted by elements arranged with the hardware architecture of a computer (20). This architecture comprises in particular a processor (PRC_T) and ROM and RAM type memory components communicating via one or more data buses (Bt).

From a functional point of view, the terminal T1, in this example a mobile terminal, includes in particular the functional modules described below:

- a network communication interface module I/O for setting up communication sessions using a communication protocol such as a protocol of the hypertext transfer protocol (HTTP) type or of the hypertext transfer protocol secure (HTTPS) type, or indeed such as the session initiation protocol (SIP), over the network NW in order to communicate with the server SVR, and also to enable mobile telephony communication sessions to be set up with the other terminals of the group (the terminal T2 in this example);
- an operating system module OS-T, e.g. the Android™ operating system from the supplier Google, for managing interaction between the various modules and the processor PRC-T of the terminal T1;
- a display device SCR/KB associated with a (touch or mechanical) keyboard and a display screen coupled with a graphical user interface (GUI) module for presenting graphically to the user of the terminal data relating to a virtual space and to the associated multimedia contents;
- a memory module M1-T storing program instructions of the client application AP-T of the invention, which, when executed by the processor PRC-T of the terminal, causes a connection to be made with the communication server SVR via the network NW in order to create a virtual communication space for a group of users, and cause requests to be generated for performing actions relating to an activity under consideration of a space that has already been created, which requests are then sent to the server.

The memory module M1-T also contains a submodule for managing presence of users of the group in the virtual space. The presence management submodule includes in particular instructions adapted to process presence notification messages coming from the notification server (NO) of the server SVR. These notification messages convey information about changes in the presence state for one or more users in the virtual space.

The presence management submodule is coupled with the GUI graphics interfaces module of the terminal which is then used in particular to display a graphics icon on the screen of the terminal for each of the activities, which graphics icon represents the activity in question. For this purpose, in accordance with the invention, the GUI module includes software elements suitable for acting for each of the activities to determine a graphical representation for the associated icon. The graphical representation for each icon is determined as a function of the presence state for users relating to that activity. Thus, the user(s) participating in the activity in question can be identified quickly in visual manner.

The memory M1-T of a terminal (T1, T2) further stores software components serving respectively to implement the algorithms (or "logics") for executing activities supplied by the virtual space hosted in the server, and for updating or downloading these algorithms from the server SVR, in particular when the application AP-T of the terminal does not have these algorithms initially or when new activities and the associated execution algorithms become available (changes in the service). The memory module M1-T also includes an orchestrator software module for managing the execution of activities in association with the graphics interface module GUI; and a second memory module M2-T of the cache memory type, i.e. a memory that acts temporarily to store copies of data coming from another data source in order to reduce access times (for reading and/or writing) of a processor to the data. In this example, the memory M2-T serves to store a copy replicating the current state of the virtual space under consideration (specifically associated with the group of users having the terminals T1 and T2), i.e. a copy replicating the multimedia contents associated with the activities supplied by the virtual space. This replicated copy is updated each time a terminal (T1, T2) connects to the server SVR. Access to the data stored in the memory M2-T or directly in the server SVR via a network connection is managed by a specific software module of the application AP-T.

Figure 2:
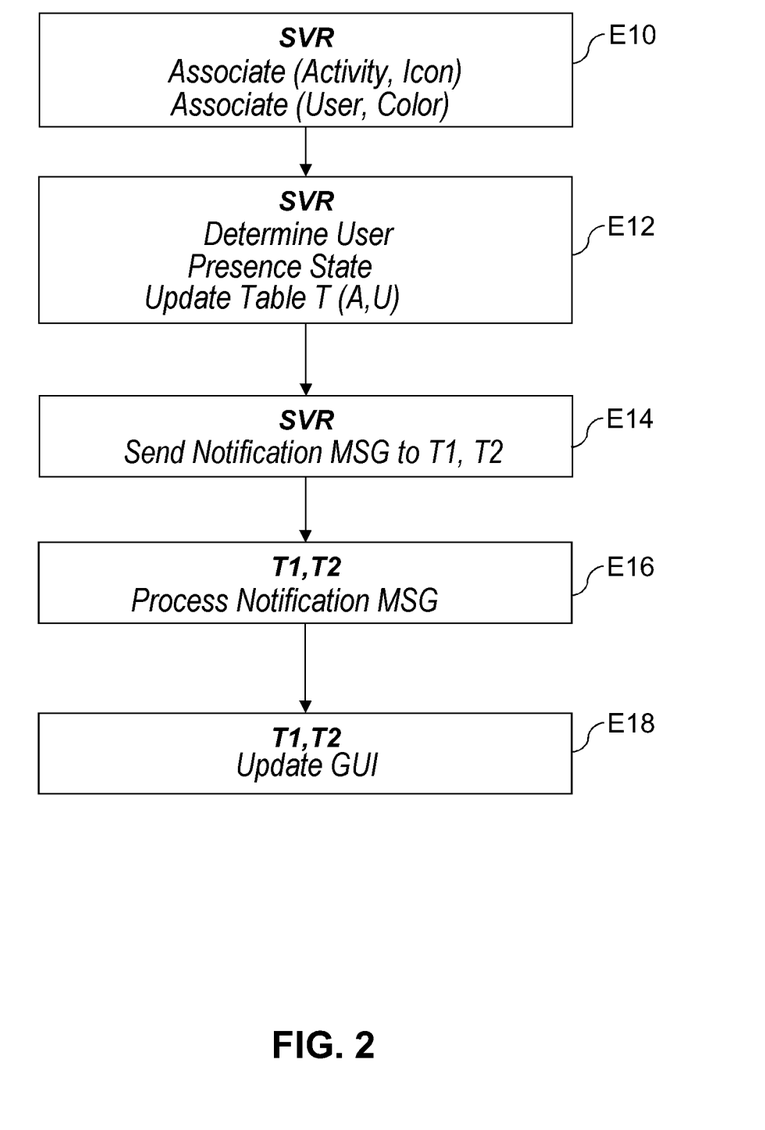
FIG. 2 is in the form of a flow chart and it shows the main steps of a method of the invention for communicating a presence state for a group of users in a virtual communication space.

FIG. 2 is in the form of a flow chart showing the main steps of a method of communicating a presence state for a group of users in a virtual communication space in accordance with an implementation of the invention. The steps of the method shown in FIG. 2 are described below with reference to FIGS. 3a-3c which show respective examples of graphics icon display strips for displaying on a terminal of the invention, where such a strip changes appearance as a function of changes of presence for a group of two users in a virtual communication space of the invention.

Figure 3A:
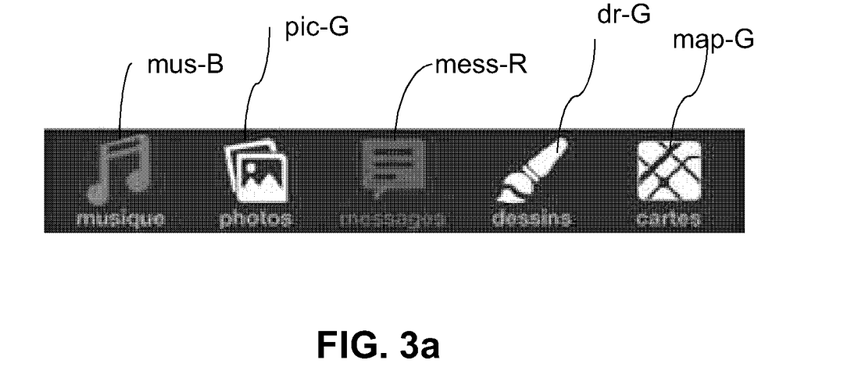
FIGS. 3a-3c show respective example display strips of graphics icons of the invention for displaying on a communications terminal of the invention.
Figure 3B:
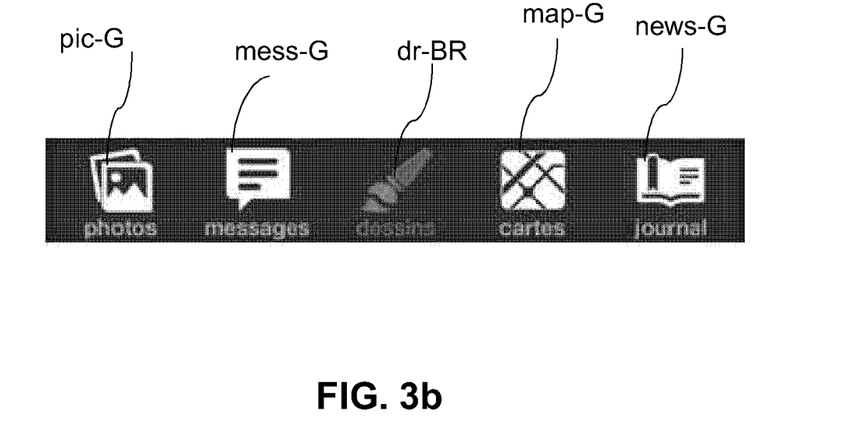
Figure 3C:
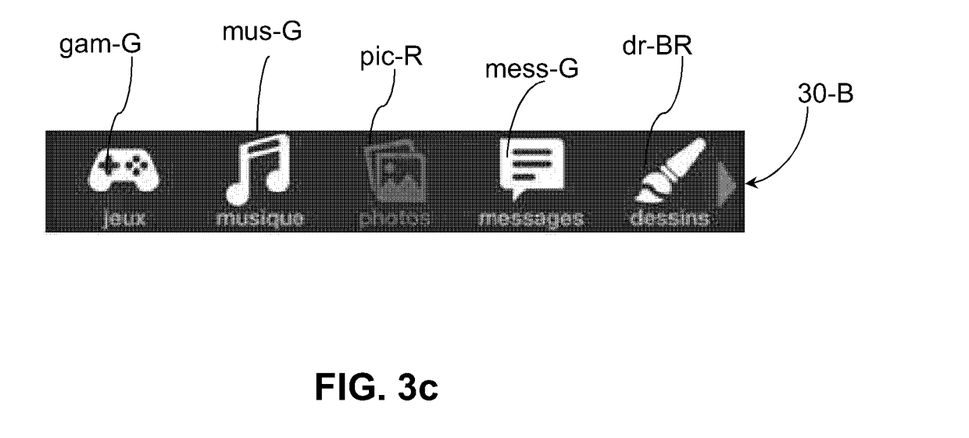

A step E10, which is performed in the server during configuration of the virtual space associated with the group of users A and B respectively having terminals T1 and T2, comprises associating each of the activities made available by the virtual space with a graphics icon representing the activity. Depending on the selected implementation, this association may be predefined by the server application or it may be determined by user choice from a library of icons. Concerning the (activity, icon) association, the examples of FIGS. 3a-3c show icons (respectively: mus, pic, mess, dr, map, news, gam) that represent respective activities (respectively: music, photos, messages, drawings, maps, news, games).

Still in step E10, all of the users A, B are associated with respective colors that are to represent them. For a particular (user, color) association, the examples of FIGS. 3a-3b correspond to allocating the color blue (B) to one of the two users of the group, e.g. the user A, and the color red (R) to the other user, the user B in this example. This allocation may be performed automatically by the application server or it may be selected by the users of the group.

In a step E12, the presence management module of the server SS determines the presence state for the users A and B in the virtual space. For example, the user A is present in the music activity (mus) and the user B is present in the messaging activity (mess). The presence table referenced T(A, U) is thus updated in the presence management server (SS).

There follows two examples of formats suitable for use in presence tables (examples 1 and 2).

| Presence table - Example 1 Activity data (user A, user B): |
|---|
| Activity 1 (presence A = 0, presence B = 1) Activity 2 (presence A = 0, presence B = 0) Activity 3 (presence A = 0, presence B = 0) |

| Presence table - Example 2 Activity data (user A, user B): |
|---|
| List of shared activities (activity1, activity2, . . . ) Presence (A) = absent Presence (B) = activity 1 |

Once the presence table is up to date in the presence server, notification messages are sent in a step E14 to the terminals T1, T2 in order to update the GUI graphics interfaces used by the client applications (AP-T) being executed in each of the terminals. In the embodiment described, the notification messages are transmitted to the terminal by using an HTTP or SIP type protocol. In an alternative or additional implementation variant, it is possible to envisage a mode in which changes of presence state are exchanged directly between user terminals, i.e. a mode that is decentralized relative to the server SVR. In this implementation variant, it is possible to use a communications protocol that is compatible with a peer-to-peer (P2P) mode of communication between the terminals, e.g. the HTTP or the SIP protocol.

After receiving presence state notification messages (Notification MSG) in each of the terminals T1 and T2 of the users A and B, in a step E16, the client application (AP-T) of each terminal processes the received notification messages and then co-operates with the graphics interface module GUI in a step E18 in order to determine the graphical representation of the icons corresponding to the activities made available by the virtual space, as a function of the presence state concerning the users A and B and relating to each of the activities.

As mentioned above, FIGS. 3a-3c show respective different states for the strip of graphics icons that is to be displayed in a terminal of the invention, this strip changing appearance as a function of changes of presence concerning the group of two users A and B in the virtual space given as an example above, in which the icons (mus, pic, mess, dr, map, news, gam) represent respective activities (music, photos, messages, drawings, maps, news, games). Furthermore, in this example, the blue color (B) is allocated to the user A and the red color (R) is allocated to the user B.

In FIG. 3a, the music icon is blue (mus-B) and the messages icon is red (mess-R), indicating that the user A is present in the music activity while the user B is present in the messages activity. The icons for other activities (pic-G, dr-G, map-G) are displayed in a "neutral" color, e.g. a gray color (G), indicating the fact that no user is present for these activities.

In FIG. 3b, only the drawing icon is colored (with a color other than the neutral color (gray)). More precisely, the top portion of the paintbrush is red in color while the bottom portion of the paintbrush is blue in color (colors that are not visible in the figure). This is indicated by the reference sign dr-BR (drawings icon (dr), blue (B), and red (R)). The graphical representation of the drawings icon thus indicates that the two users A and B are sharing the drawings activity.

In FIG. 3c, the graphics strip displayed on the screen of the terminal cannot display all of the activity icons simultaneously. Under such circumstances, a sign in the form of a triangle 30 indicates that more icons can be displayed to the right, by causing the strip to scroll from right to left, e.g. by touching the screen (touch screen). In the visible portion of the strip, only the photos icon (pic) is colored, with a red color (R), indicating that the user B is present in the photos activity. Concerning the user A, the sign in the form of a triangle 30 is displayed in blue (B), which means that the user A is present in an activity for which the icon is not displayed in the currently visible portion of the strip, but can be displayed by causing the strip to scroll from right to left, for example the icon corresponding to the maps activity or the icon corresponding to the news activity.

Although the present disclosure has been described with reference to one or more examples, workers skilled in the art will recognize that changes may be made in form and detail without departing from the scope of the disclosure and/or the appended claims.

The invention claimed is:

1. A method of communicating a presence state for a group of users having user terminals relating to their presence in a virtual communication space provided by a communication server on a communication network, said virtual communication space providing a plurality of distinct communication modes referred to as "activities" that can be shared by all of the users of said group, said method comprising the following operations:
  associating each of the activities of the virtual communication space with a respective graphics icon having a geometrical shape and representing said activity, the icon being for displaying via a graphics interface implemented by an activities sharing client application that is installed in each user terminal;
  associating each user of the group of users with a specific color representing the user;
  determining a presence state for each user of the group in the virtual communication space; and
  for each of the activities, graphically formatting the icon associated to the respective activity without modifying the geometrical shape of the icon, as a function of the color associated with each user present for the respective activity, whereby each of the users of the group participating in the respective activity is visually identified distinctively in the icon associated to the respective activity.

2. The method according to claim 1, wherein the graphically formatting comprises, for at least one of the activities:
  when no user of the group of users is present, the graphics icon associated with said at least one activity is displayed with a determined "neutral" color;
  when a single user of the group of users is present, the graphics icon associated with said at least one activity is represented graphically with the color identifying the user present for that activity; and
  when at least two users of the group of users are present, the graphics icon associated with said at least one activity is graphically formatted with the various colors identifying said at least two users, respectively.

3. The method according to claim 1, wherein the operation of determining a presence state for each user of the group in the virtual communication space comprises:
  detecting a connection of the user to the communication server and a selection of at least one of the activities by that user; and
  updating a data structure by putting activity identifiers into correspondence with user identifiers, each of the user identifiers put into correspondence with a respective one of the activity identifiers indicating that the corresponding user is currently present in the corresponding activity.

4. The method according to claim 3, wherein, in response to said data structure being updated, a presence notification message is transmitted to the user terminals in order to cause the graphics interface being used by the client application in each terminal to be updated correspondingly.

5. The method according to claim 1, wherein each of the activities provided by said virtual communication space relates to at least one associated multimedia content, referred to as activity content, that is shared by the users of the group, each of the activities being implemented by determined actions that can be triggered for execution by all of the users of the group, said actions including at least one of creating, modifying, or deleting a given activity content; and
  wherein requests for actions relating to a respective one of the activities and coming from the terminals of the users of the group are processed in sequential manner in the order of arrival of said requests.

6. The method according to claim 5, wherein the method comprises, in response to a user present in a respective one of the activities, graphically formatting the icon representing the respective activity with an additional graphical effect, said additional graphical effect indicating that said user, present in the respective activity, is currently active.

7. A communication server configured to implement a method of communicating a presence state for a group of users having user terminals and relating to their presence in a virtual communication space provided by a communication server on a communication network, said virtual communication space providing a plurality of distinct communication modes referred to as "activities" that can be shared by all of the users of said group, each of the activities made available by the virtual communication space being associated with a respective graphics icon representing said activity and for being displayed via a graphics interface implemented by an activity sharing client application installed in each user terminal, and wherein each user of the group is associated with a specific color representing the user and the graphics icon makes it possible visually to identify in the icon each of the users of the group participating in said activity without modifying a geometrical shape of the icon, said communication server comprising:
  means for determining a presence state for each user of the group in the virtual communication space; and
  means for acting following a change in the presence state for the group of users in the virtual communication space by sending presence notification messages to user terminals in order to cause each of the terminals to update the graphics interface being used by the client application installed in each terminal to graphically format the graphics icon as a function of the color associated with each user present for the respective activity, whereby each of the users of the group participating in the respective activity is visually identified distinctively in the icon associated to the respective activity without modifying a geometrical shape of the icon.

8. The server according to claim 7, wherein said means for determining a presence state include:
  means for detecting a connection of a user of the group to said virtual communication space and for detecting a selection of at least one of the activities by the user; and means for updating a data structure that puts activity identifiers into correspondence with user identifiers, each of the user identifiers that is put into correspondence with a respective one of the activity identifiers indicating that the corresponding user is currently present in the corresponding activity.

9. A communication terminal comprising:

means for connecting to a virtual communication space provided by a communication server on a communication network, said virtual communication space providing a plurality of distinct communication modes referred to as "activities", suitable for being shared by all of the users of a determined group of users;

message processing means for processing presence notification messages received from a notification server and conveying information about a change in a presence state for the users of the group in said virtual communication space; and graphics interface means coupled to said message processing means in order to display a respective graphics icon for each of said activities, each graphics icon having a geometrical shape and representing said activity associated to the respective graphics icon, and each user of the group being associated with a specific color representing the user, and wherein the graphics interface means graphically formats the icon associated to the respective activity, without changing the geometrical shape of the icon, as a function of the color associated with each user present for the respective activity, whereby each of the users of the group participating in the respective activity is visually identified distinctively in the icon associated to the respective activity.

10. A non-transitory computer-readable data medium comprising a computer program stored thereon and including program instructions that, on being executed, by a processor of a communication server or communication terminal, configure to the communication server or communication terminal to implement acts of:

communicating a presence state for a group of users having user terminals relating to their presence in a virtual communication space provided by a communication server on a communication network, said virtual communication space providing a plurality of distinct communication modes referred to as "activities" that can be shared by all of the users of said group, said communicating comprising the following operations:

associating each of the activities of the virtual communication space with a respective graphics icon having a geometrical shape and representing said activity, the icon being for displaying via a graphics interface implemented by an activities sharing client application that is installed in each user terminal;

associating each user of the group with a specific color representing the user;

determining a presence state for each user of the group in the virtual communication space; and for each of the activities graphically formatting the icon associated to the respective activity without modifying the geometrical shape of the icon, as a function of the color associated with each user present for the respective activity, whereby each of the users of the group participating in the respective activity is visually identified distinctively in the icon associated to the respective activity.

* * * * *